United States Patent
Chen et al.

(10) Patent No.: US 11,976,193 B2
(45) Date of Patent: May 7, 2024

(54) METHOD FOR DETECTING THICKNESS OF BONDED RUBBER OF CARBON BLACK IN NATURAL RUBBER BASED FOR REINFORCEMENT PERFORMANCE

(71) Applicant: SICHUAN UNIVERSITY OF SCIENCE & ENGINEERING, Zigong (CN)

(72) Inventors: Jian Chen, Zigong (CN); Zhiqiang Lei, Zigong (CN); Long Qing, Zigong (CN); Rui Li, Zigong (CN); Sha Liu, Zigong (CN); Lin Li, Zigong (CN)

(73) Assignee: SICHUAN UNIVERSITY OF SCIENCE & ENGINEERING, Zigong (CN)

( * ) Notice: Subject to any disclaimer, the term of this patent is extended or adjusted under 35 U.S.C. 154(b) by 437 days.

(21) Appl. No.: 17/399,220

(22) Filed: Aug. 11, 2021

(65) Prior Publication Data

US 2022/0049072 A1 Feb. 17, 2022

(30) Foreign Application Priority Data

Aug. 17, 2020 (CN) .......................... 202010825475.X

(51) Int. Cl.
*C08L 7/00* (2006.01)
*C08K 13/02* (2006.01)
(Continued)

(52) U.S. Cl.
CPC ................ *C08L 7/00* (2013.01); *C08K 13/02* (2013.01); *G01B 5/06* (2013.01); *G01Q 60/24* (2013.01);
(Continued)

(58) Field of Classification Search
CPC ........ G01Q 10/00; G01Q 10/02; G01Q 10/04; G01Q 20/00; G01Q 30/00; G01Q 30/20;
(Continued)

(56) References Cited

U.S. PATENT DOCUMENTS

| | | | | |
|---|---|---|---|---|
| 2004/0248134 A1* | 12/2004 | Sperling | ................ | C07H 21/00 435/6.15 |
| 2005/0239139 A1* | 10/2005 | Estey | ................. | G01N 33/6896 435/7.1 |
| 2020/0041541 A1* | 2/2020 | Osechinskiy | .......... | G01Q 20/04 |

FOREIGN PATENT DOCUMENTS

CN 103358828 A 10/2013

OTHER PUBLICATIONS

Qu et al., Nanoscale Visualization and Multiscale Mechanical Implications of Bound Rubber-Carbon Black Nanocomposites, 2011, Royal Society of Chemistry, 7, 1066-1077. (Year: 2011).*

(Continued)

*Primary Examiner* — Jason L McCormack

(57) ABSTRACT

A method for detecting a thickness of bonded rubber of a carbon black in a natural rubber based for reinforcement performance is provided. An ultra-thin frozen microtome to prepare a sample, a tapping mode of the atomic force microscope is used, and when characterizes the carbon black and rubber composite material, the difference of imaging characteristics between morphological and phase diagrams is used, the characteristics of bonded rubber of carbon black reinforced composite material can be observed to obtain the thickness of bonded rubber, and then influence of bonded rubber on rubber performance and the reinforcement performance of the carbon black in the rubber are analyzed. The method has advantages of simple operation, no need for excessive sample processing, high detection efficiency, clear detection images and high detection accuracy, thereby hav- (Continued)

ing better applicability and providing a new method and idea for studying reinforcements of fillers.

5 Claims, 3 Drawing Sheets

(51) Int. Cl.
*G01B 5/06* (2006.01)
*G01Q 60/24* (2010.01)
*C08K 3/04* (2006.01)
*C08K 3/22* (2006.01)
*C08K 3/30* (2006.01)
*C08K 5/36* (2006.01)

(52) U.S. Cl.
CPC ........ *C08K 3/04* (2013.01); *C08K 2003/2296* (2013.01); *C08K 3/30* (2013.01); *C08K 5/36* (2013.01); *C08K 2201/014* (2013.01)

(58) Field of Classification Search
CPC ........ G01Q 60/00; G01Q 60/02; G01Q 60/24; G01Q 60/32; G01Q 60/34
USPC ..................................... 830/33, 38
See application file for complete search history.

(56) References Cited

OTHER PUBLICATIONS

Qu et al., Nanoscale Visualization and Multiscale Mechanical Implication of Bound Rubber-Carbon Black Nanocomposites, 2011, Royal Society of Chemistry, 7, 1066-1077. (Year: 2011).*

* cited by examiner

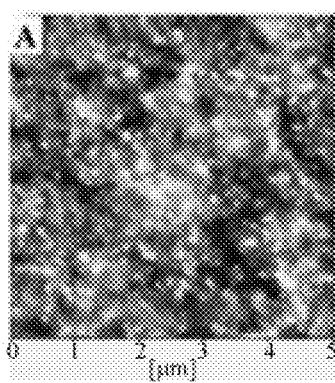 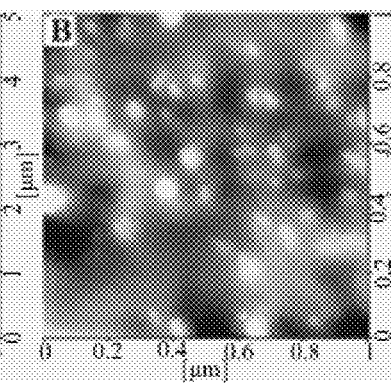 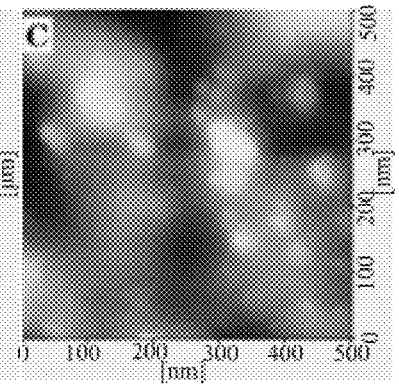
FIG. 1A  FIG. 1B  FIG. 1C
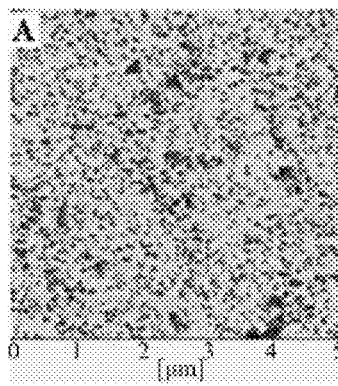 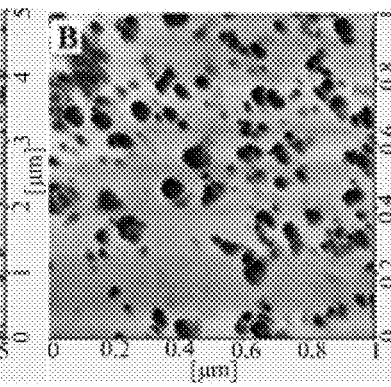 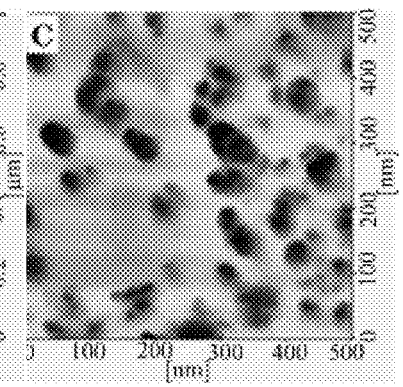
FIG. 2A  FIG. 2B  FIG. 2C
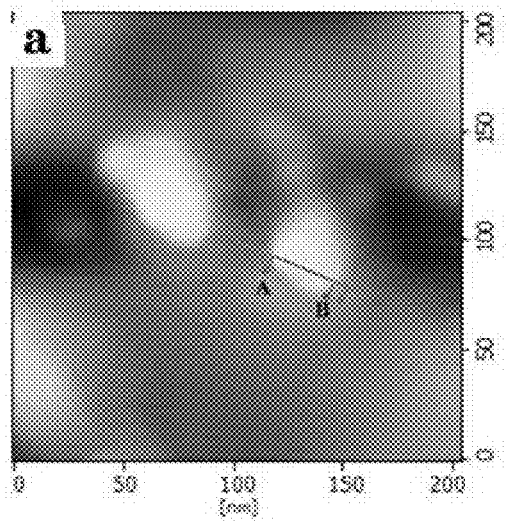 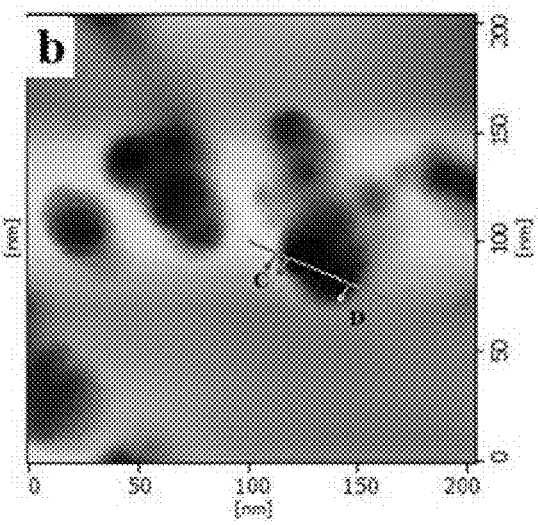
FIG. 3A  FIG. 3B

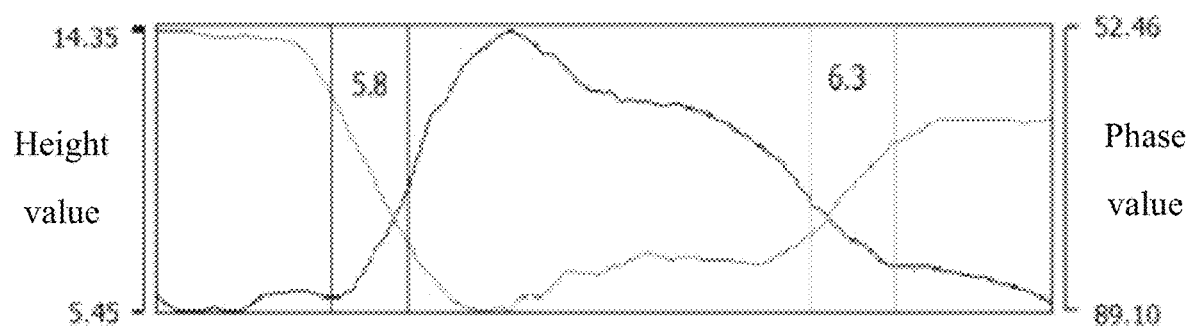
FIG. 4
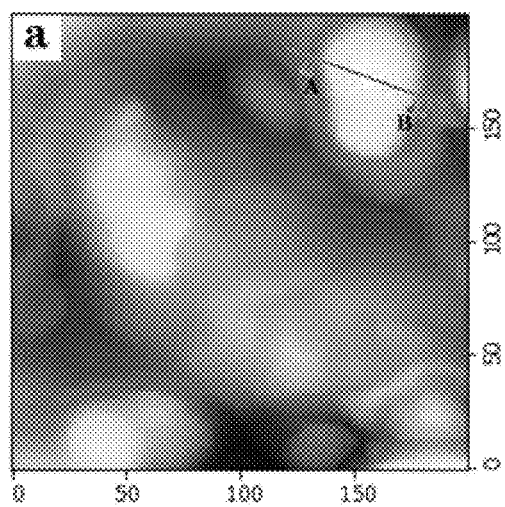 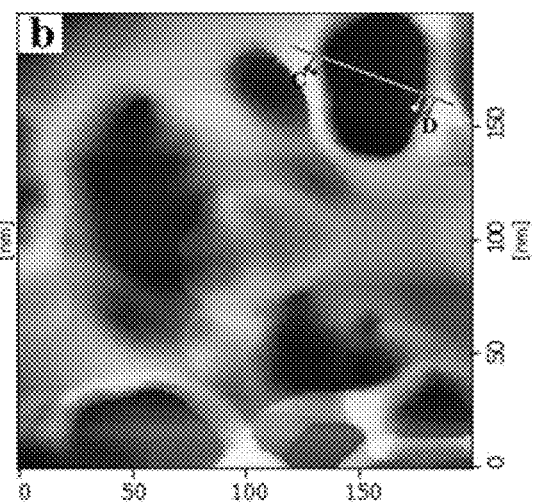
FIG. 5A    FIG. 5B
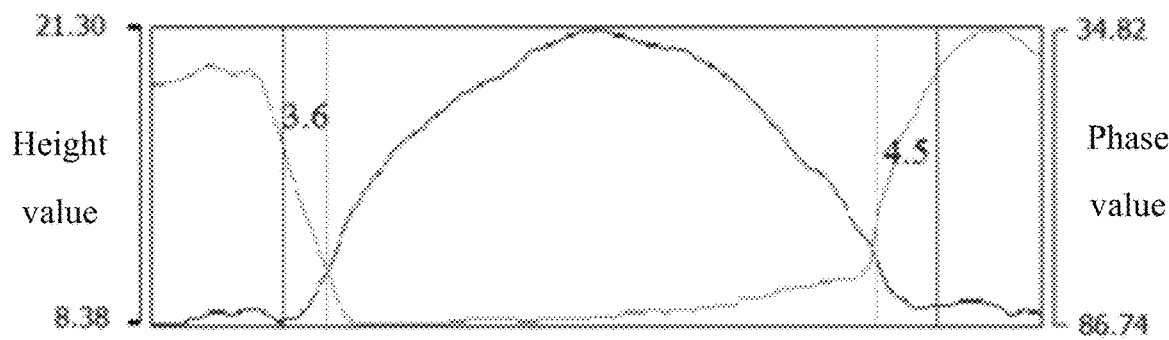
FIG. 6

METHOD FOR DETECTING THICKNESS OF BONDED RUBBER OF CARBON BLACK IN NATURAL RUBBER BASED FOR REINFORCEMENT PERFORMANCE

FIELD OF THE DISCLOSURE

The disclosure relates to the field of rubber composite materials, and more particularly to a method for detecting a thickness of bonded rubber of a carbon black in a natural rubber based for reinforcement performance.

BACKGROUND OF THE DISCLOSURE

After more than 130 years of development, the automobile industry is now an important force to promote a new round of scientific and technological revolution and industrial revolution, as an important supporter for building a powerful country, and as an important brace industry of national economic. It is closely related to people's travels and promotion of ecological civilization. Automobile tires are important components of an automobiles, which play a role in bearing a full weight of the automobile and ensuring good adhesion between wheels and a road surface. A tire tread is a part that directly contacts with the ground. The quality of a rubber for the tread directly affects the safety and riding comfort of the automobile. Therefore, as a reinforcing filler for the tread, the importance of the carbon black is self-evident. At the beginning of last century, i.e., in 1910s, B.F. Goodrich company firstly discovered that adding a large amount of carbon black into a rubber can improve the wear resistance of the tire, thereby greatly extending the service life of the tire, and moreover as mentioned in the Chinese patent publication No. CN103358828A, a proper handling/treatment of the carbon black can also prevent static electricity. Since then, a demand for the carbon black has increased significantly, and a transformation of the carbon black from a colorant to a reinforcing filler has also been completed. The carbon black has become a raw material for the rubber industry, second only to the raw rubber. With the rapid development of the carbon black industry, the rubber reinforced by the carbon black also has better practicability and gained greater commercial value. Therefore, the carbon black industry is closely related to the rubber industry. About 90% of carbon black products are used in the rubber industry, of which about 67.5% are used in tires, and about 22% are used in other rubber products.

However, why the carbon black has a reinforcing effect on the rubber and which nature of the carbon black itself determines the effect? A new carbon black can be developed after only by clarifying these questions. The reinforcing effect of the carbon black on rubber has a profound impact on the development of the rubber industry. Therefore, its reinforcing mechanism for the rubber and a corresponding reinforcing model have always been the research focus and hotspot of industry researchers. Through the efforts of several generations of scientists and the progress of related scientific research equipment, although there have been a lot of research results on mechanisms of the carbon black reinforcing rubbers, and some more mature reinforcement mechanisms have been extracted, there has not been a recognized sole authoritative mechanism that can perfectly explain the reinforcing effect of the carbon black on the rubber. Therefore, the reinforcing effect of the carbon black on the rubber and an action mechanism of a carbon black and rubber composite are still worthy of in-depth study.

At present, a filler network theory, a molecular chain sliding theory, a Van Der Waals network theory and a bonded rubber theory are several reinforcement theories with high degrees of recognition. Among them, the bonded rubber theory believes that a bonding position of a carbon black and a rubber will produce a bonded rubber, and when subjected to an external force, the bonded rubber can prevent stress concentration and delay a breakage of a molecular chain. A most fundamental aspect of carbon black's reinforcement on rubber is the nature of the bonding between the carbon black and the rubber, and a characteristic of the bonded rubber produced at the bonding position also affects the reinforcement ability of the carbon black. The bonded rubber is also called as carbon black gel, which refers to the rubber bonded to chemical bonds on a surface of the carbon black during a blending/mixing process of the rubber and the carbon black. It is a factor/value that measures the bonding effect of a filler and the rubber. The bonded rubber is used to characterize an interaction between the rubber and the filler. The higher the content of the bonded rubber, the stronger the force between the rubber and the filler, and the better various physical properties of rubber products such as strength, elasticity, tearing, abrasion, etc. Therefore, many experts would involve the concept of bonded rubber when studying the reinforcement performance of a filler to the rubber, and try to learn the mechanism of the filler reinforcing rubber by studying some of properties of the bonded rubber. At present, a rubber composite is immersed into a benign solvent, and a content of the bonded rubber is calculated out by measuring a mass reduction of a tested rubber sample, but the operation is cumbersome. Accordingly, there is currently no suitable way to measure the performance of the bonded rubber, so that the research in this area cannot be widely carried out, and there has been no report on measuring a thickness of the bonded rubber to characterize the reinforcing performance of the carbon black.

SUMMARY OF THE DISCLOSURE

In view of the above-mentioned shortcomings in the prior art, an objective of the disclosure is to provide a method for detecting a thickness of bonded rubber of a carbon black in a natural rubber based for reinforcement performance, which provides a new method for characterizing the reinforcement performance of the carbon black, thereby providing more choices for the research of rubber products.

In order to achieve the above objective, technical solutions are proposed by the disclosure as follows.

Specifically, a method for detecting a thickness of bonded rubber of a carbon black in a natural rubber based for reinforcement performance includes following steps of:

(1) using a cutter to prepare/fabricate a rubber product to-be-detected into a strip rubber product of a predetermined size, clamping the strip rubber product by an atomic force microscope (AFM) dedicated sample clamper and putting the clamped strip rubber product into a chamber of a microtome, and tightening a screw to fix the strip rubber product in the microtome, wherein the rubber product to-be-detected is obtained by mixing a rubber, a carbon black and an additive to form a rubber composite and then performing a vulcanization reaction on the rubber composite, and the additive is one or more selected from the group consisting of a reinforcing filler, an antioxidant, oil and a vulcanization system;

(2) making a temperature of the fixed strip rubber product be in a range of −100° C.~−60° C., using an AFM dedicated slicing knife to slice the strip rubber product to cut out a flat surface (i.e., to obtain a flat cut surface), cleaning the cut surface of a slice 2-5 times with absolute alcohol at room temperature and placing the slice under a microscope for observation until there is no debris and then being for later use;

(3) scanning the cut surface of the slice prepared in step (2) in a working mode, i.e., TappingMode™ of an AFM probe at room temperature and atmospheric conditions to obtain a morphological diagram and a phase diagram of the cut surface; and (4) measuring a thickness of a bonded rubber by observing the morphological diagram and the phase diagram, and determining a reinforcement performance of the carbon black in the rubber product according to the thickness of the bonded rubber.

In a preferred embodiment, the vulcanization system includes sulfur, a vulcanization accelerator and zinc oxide.

In a preferred embodiment, a velocity of slicing the strip rubber product is 1~3 mm/s.

In a preferred embodiment, a thickness of the slice is 50~100 nm.

In a preferred embodiment, a time for the vulcanization reaction is 30~50 minutes.

Compared with the prior art, beneficial effects of the embodiments of the disclosure may be as follows:

1. after adopting an ultra-thin frozen microtome to prepare a sample, the embodiment of the disclosure uses the TappingMode™ of the atomic force microscope for scanning, and when characterizes the carbon black-rubber composite material, the difference of imaging characteristics between the morphological diagram and the phase diagram is used, the characteristics of the bonded rubber of the carbon black reinforced composite material can be directly observed to obtain the thickness of the bonded rubber, and then the influence of the bonded rubber on the performance of the rubber and the reinforcement performance of the carbon black in the rubber are analyzed. Firstly, the sample is prepared by cutting under a low temperature condition, which can avoid interference with internal morphology during sample preparation at routine temperature (e.g., at room temperature); secondly, the TappingMode™ of the atomic force microscope (AFM) is used to scan the slice, which can avoid the probe tip being dragged across/over the sample in the traditional contact mode and affected by friction, adhesion, electrostatic force, etc., thereby effectively overcoming the shortcoming of the probe tip scratching the sample during the scanning process, and accurately obtaining the morphological and phase diagrams to ensure the accuracy of the results. The embodiments of the disclosure can be applied to the detection of fillers in other polymers, provide a new method and idea for studying the reinforcement performance of fillers, and has good application prospects.

2. the embodiments of the disclosure directly detect the reinforcement performance of the carbon black through the morphological and phase diagrams of the sample slice, and have the advantages of simple operation, no need for excessive sample processing, high detection efficiency, clear detection images, and high detection accuracy. As a result, better applicability can be achieved and it can be widely used in the technical field of rubber composite materials.

3. the methods described in the embodiments of the disclosure can provide a method/solution for future rubber researches. By observing the difference between a region near the carbon black phase and a region near the rubber phase, properties of the bonded rubber can be further explored.

BRIEF DESCRIPTION OF THE DRAWINGS

FIG. 1A-FIG. 1C are morphological diagrams of different sizes of a N115 carbon black contained rubber composite according to embodiment 1 of the disclosure, where FIG. 1A is corresponding to the size of 5000 nm×5000 nm, FIG. 1B is corresponding to the size of 1000 nm×1000 nm, and FIG. 1C is corresponding to the size of 500 nm×500 nm.

FIG. 2A-FIG. 2C are phase diagrams of different sizes of the N115 carbon black contained rubber composite according to the embodiment 1 of the disclosure, where FIG. 2A is corresponding to the size of 5000 nm×5000 nm, FIG. 2B is corresponding to the size of 1000 nm×1000 nm, and FIG. 2C is corresponding to the size of 500 nm×500 nm.

FIG. 3A-FIG. 3B are atomic force microscope (AFM) images each with a size of 200 nm×200 nm of the N115 carbon black contained rubber composite according to the embodiment 1 of the disclosure, where FIG. 3A is a morphological diagram, and FIG. 3B is a phase diagram.

FIG. 4 is a cross-sectional profile view of a carbon black particle taken at positions of scribe lines in the AFM images according to the embodiment 1 of the disclosure.

FIG. 5A-FIG. 5B are AFM images each with a size of 200 nm×200 nm of a N330 carbon black contained rubber composite according to an embodiment 2 of the disclosure, where FIG. 5A is a morphological diagram, and FIG. 5B is a phase diagram.

FIG. 6 is a cross-sectional profile view of a carbon black particle taken at positions of scribe lines in the AFM images according to the embodiment 2 of the disclosure.

FIG. 7A is a morphological diagram, and FIG. 7B is a phase diagram.

DETAILED DESCRIPTION OF EMBODIMENTS

Figure 7A:
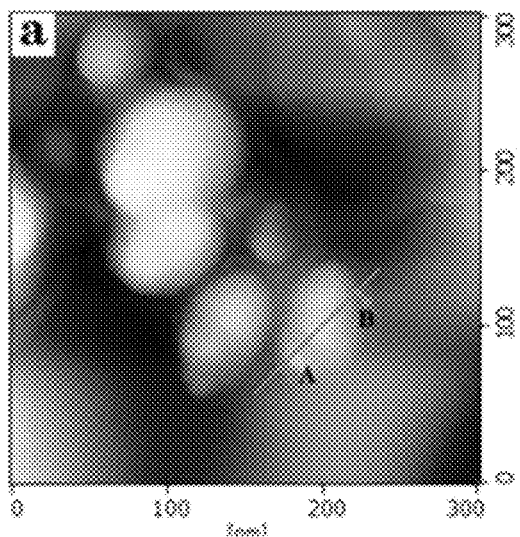
FIG. 7A-FIG. 7B are AFM images each with a size of 200 nm×200 nm of a N550 carbon black contained rubber composite according to an embodiment 3 of the disclosure, where

The disclosure will be further described in detail below in conjunction with specific/concrete embodiments and drawings. In the following embodiments, experimental methods not specifically described are all routine operations, and reagents used are common commercially available reagents.

Embodiment 1

(1) a formula of a rubber composite for mixing may be composed of the following ingredients by mass: natural rubber, 100 parts; N115 carbon black, 50 parts; stearic acid, 3 parts; zinc oxide, 5 parts; accelerator DM (its chemical formula: $C_{14}H_8N_2S_4$), 0.6 parts; and sulfur, 1.5 parts. After weighing the ingredients according to the formula, a mixing process thereof is carried out according to a Chinese national standard in the art and specific experimental steps may include steps S1~S3 as follows:

S1, the carbon black is placed in a drying box to dry before the mixing, and after the drying the dried carbon black is placed in a clean environment for later use.

S2, during the mixing, firstly, an operating distance between two baffles is set to be 200 mm, a roller temperature is controlled to be 70° C., and a distance between two rollers of a mixer is adjusted to be 1.4 mm. The natural rubber is added without wrapping the rollers and the added material is broken once, and then the natural rubber is wrapped on a front roller, cutting is carried out twice, and an operation time is 2 minutes. Afterwards, the distance between the rollers is adjusted to be 1.65 mm, the stearic acid is added, cutting is carried out once during the operation time, and the operation time is 2.5 minutes. A mixture of the sulfur, the accelerator DM and the zinc oxide is added in two times, cutting is carried out twice during the operation time, and the operation time is 2 minutes. Subsequently, the distance between the rollers is adjusted to be 1.9 mm, all the carbon black is added in multiple times and cutting is carried out twice during the operation time, the carbon black fallen in a receiving tray then is mixed into the rubber again, cutting is carried out three times and the operation time is 7.5 minutes, so as to make the carbon black be uniformly mixed in the natural rubber. It should be noted that when there are obvious powders on the rubber, the cutting is not carried out, and all the materials fallen into the tray must be mixed into the rubber. After that, the distance between the rollers is adjusted to be 0.8 mm, the curled rubber is let to uprightly pass through a gap between the rollers six times without wrapping the rollers. The distance between the rollers is adjusted so that a thickness of a rubber composite sheet is not less than 6 mm, a folded rubber composite sheet is then let to pass through the gap between the rollers four times, and the operation time is 1 minute. A total operation time for the above mentioned operations is 17 minutes. Finally, the distance between the rollers is adjusted to be 2.2 mm for unloading the rubber composite sheet. The rubber composite sheet prepared after the mixing is then placed on a flat, dry and clean metal plate to be cooled down, and the cooled rubber composite sheet is dried for later use.

S3, a vulcanization is implemented according to the standard. Firstly, the previously prepared rubber composite sheet is trimmed according to a size of standard mold, a temperature of a plate of a vulcanizing machine is raised, the mold is then placed on a suitable position of the plate to preheat for 20 minutes, and after the temperature stabilizes, the trimmed rubber composite sheet is quickly installed in the mold for vulcanization. After it is installed in the mold, when a pressure applied onto the mold meets a requirement, the time is started to be counted immediately and the vulcanization time is set to be 30 minutes. After the vulcanization, the vulcanized rubber composite sheet is removed from the mold to obtain a mixed rubber composite of rubber and carbon black N115 as a rubber product for later use.

(2) using a cutter to prepare/fabricate the rubber product obtained in step (1) into a strip (i.e., strip rubber product) of appropriate size, clamping the strip with an AFM dedicated sample clamper and putting it into a chamber of a microtome/slicer, and tightening a screw to fix the strip in the microtome. A trimming knife and an AFM slicing knife are installed on two sides of a knife holder and then put into the chamber of the microtome, one side of the trimming knife is aligned with the sample, and a screw is tightened to fix the knife holder.

(3) operating a display screen to pump liquid nitrogen to cool the chamber of the microtome, setting temperatures of a sample holder, the knife holder and the chamber to be −60° C., and after the temperatures of a sample holder, the knife holder and the chamber all drop and then stabilize at −60° C., using an AFM dedicated slicing knife to slice/cut the rubber sample (strip) so as to cut out a flat surface (i.e., obtain a flat cut surface), with a slicing/cutting speed of 1 mm/s and a slice thickness of 50 nm, cleaning the cut surface of the sample 2-5 times with absolute alcohol at room temperature and placing the slice under a microscope for observation until there is no debris and for later use.

(4) scanning the cut surface of the sample prepared in step (3) in the TappingMode™ by an AFM probe under room temperature and atmospheric conditions, and obtaining its morphological diagrams and phase diagrams, as shown in FIG. 1 and FIG. 2 respectively.

As seen from the morphological diagrams, the carbon black basically exists in the rubber in the form of aggregates. Because the exposed carbon black aggregates are not complete, although it is difficult to accurately determine the form of carbon black in the rubber, it is enough to understand/learn the form of carbon black in the rubber. As seen from the phase diagrams, it can be found that basically boundaries between all carbon black aggregates and the rubber matrix are very blurred, and there is a circle of brown structure at the junction of carbon black edges and the rubber matrix, and the farther away from the carbon black, the lighter the color thereof.

(5) using an AFM analysis software to mark positions of a same carbon black aggregate in the morphological diagram and the phase diagram obtained in step (4) with same straight lines. As shown in FIG. 3A-FIG. 3B, firstly, points are used in the morphological diagram (FIG. 3A) to mark edge points A and B of the carbon black aggregate on the straight line, i.e., two inner side marking points associated with the straight line; and meanwhile, points are used in the phase diagram (FIG. 3B) to mark critical points C and D of the straight line being about to reach the rubber, i.e., two outer side marking points associated with the straight line, and therefore the brown structure is located between the carbon black aggregate and the natural rubber. As seen from profile curves (FIG. 4), phase values between the two edge points are basically maintained at one value, and height values of a region from the edge point to the critical point on a same side gradually decrease. In summary, a hardness of the brown structure is between that of the carbon black and that of the natural rubber, indicating that in the phase diagram the black should be the carbon black phase and the yellow is the natural rubber phase, and the transitional brown structure is the bonded rubber. By observing the distance between every two adjacent edge point and the critical point, the thickness of the bonded rubber can be obtained as 5.8~6.3 nm.

Embodiment 2

(1) a formula of a rubber composite for mixing may be composed of the following ingredients by mass: natural rubber, 100 parts; N330 carbon black, 50 parts; stearic acid, 3 parts; zinc oxide, 5 parts; accelerator DM, 0.6 parts; and sulfur, 1.5 parts. After weighing the ingredients according to the formula, a mixing process thereof is carried out according to the Chinese national standard in the art and specific experimental steps may include steps S1~S3 as follows:

S1, the carbon black is placed in a drying box to dry before the mixing, and after the drying the dried carbon black is placed in a clean environment for later use.

S2, during the mixing, firstly, an operating distance between two baffles is set to be 200 mm, a roller temperature is controlled to be 70° C., and a distance between two rollers of a mixer is adjusted to be 1.4 mm. The natural rubber is added without wrapping the rollers and the added material is broken once, and then the natural rubber is wrapped on a front roller, cutting is carried out twice, and an operation time is 2 minutes. Afterwards, the distance between the rollers is adjusted to be 1.65 mm, the stearic acid is added, cutting is carried out once during the operation time, and the operation time is 2.5 minutes. A mixture of the sulfur, the accelerator DM (Vulcanization accelerator) and the zinc oxide is added in two times, cutting is carried out twice during the operation time, and the operation time is 2 minutes. Subsequently, the distance between the rollers is adjusted to be 1.9 mm, all the carbon black is added in multiple times and cutting is carried out twice during the operation time, the carbon black fallen in a receiving tray then is mixed into the rubber again, cutting is carried out three times and the operation time is 7.5 minutes, so as to make the carbon black be uniformly mixed in the natural rubber. It should be noted that when there are obvious powders on the mixed rubber, the cutting is not carried out, and all the materials fallen into the tray must be mixed into the rubber. After that, the distance between the rollers is adjusted to be 0.8 mm, the curled rubber is let to uprightly pass through a gap between the rollers six times without wrapping the rollers. The distance between the rollers is adjusted so that a thickness of a rubber composite sheet is not less than 6 mm, a folded rubber composite sheet is then let to pass through the gap between the rollers four times, and the operation time is 1 minute. A total operation time for the above mentioned operations is 17 minutes. Finally, the distance between the rollers is adjusted to be 2.2 mm for unloading the rubber composite sheet. The rubber composite sheet prepared after the mixing is then placed on a flat, dry and clean metal plate to be cooled down, and the cooled rubber composite sheet is dried for later use.

S3, a vulcanization is implemented according to the standard. Firstly, the previously prepared rubber composite sheet is trimmed according to a size of standard mold, a temperature of a plate of a vulcanizing machine is raised, the mold is then placed on a suitable position of the plate to preheat for 20 minutes, and after the temperature stabilizes, the trimmed rubber composite sheet is quickly installed in the mold for vulcanization. After it is installed in the mold, when a pressure applied onto the mold meets a requirement, the time is started to be counted immediately and the vulcanization time is set to be 30 minutes. After the vulcanization, the vulcanized rubber composite sheet is removed from the mold to obtain a mixed rubber composite of rubber and carbon black N330 as a rubber product for later use.

(2) using a cutter to prepare the rubber product obtained in step (1) into a strip (i.e., strip rubber product) of appropriate size, clamping the strip with an AFM dedicated sample clamper and putting it into a chamber of a microtome/slicer, and tightening a screw to fix the strip in the microtome. A trimming knife and an AFM slicing knife are installed on two sides of a knife holder and then put into the chamber of the microtome, one side of the trimming knife is aligned with the sample, and a screw is tightened to fix the knife holder.

(3) operating a display screen to pump liquid nitrogen to cool the chamber of the microtome, setting temperatures of a sample holder, the knife holder and the chamber to be −60° C., and after the temperatures of a sample holder, the knife holder and the chamber all drop and then stabilize at −60° C., using an AFM dedicated slicing knife to slice/cut the rubber sample (strip) so as to cut out a flat surface, with a slicing/cutting speed of 1 mm/s and a slice thickness of 50 nm, cleaning the cut surface of the sample slice 2-5 times with absolute alcohol at room temperature and placing the slice under a microscope for observation until there is no debris and for later use.

(4) scanning the cut surface of the sample prepared in step (3) in the TappingMode™ by an AFM probe under room temperature and atmospheric conditions, and obtaining its morphological diagram and phase diagram.

(5) using an AFM analysis software to mark positions of a same carbon black aggregate in the morphological diagram and the phase diagram obtained in step (4) with same straight lines. As shown in FIG. 5A-FIG. 5B, firstly, points are used in the morphological diagram (FIG. 5A) to mark edge points A and B of the carbon black aggregate on the straight line, i.e., two inner side marking points associated with the straight line; and meanwhile, points are used in the phase diagram (FIG. 5B) to mark critical points C and D of the straight line being about to reach the rubber, i.e., two outer side marking points associated with the straight line, and therefore the brown structure is located between the carbon black aggregate and the natural rubber. As seen from profile curves (FIG. 6), phase values between the two edge points are basically maintained at one value, and height values of a region from the edge point to the critical point on a same side gradually decrease. In summary, a hardness of the brown structure is between that of the carbon black and that of the natural rubber, indicating that in the phase diagram the black should be the carbon black phase and the yellow is the natural rubber phase, and the transitional brown structure is the bonded rubber. By observing the distance between every two adjacent edge point and the critical point, the thickness of the bonded rubber can be obtained as 3.6~4.5 nm.

Embodiment 3

(1) a formula of a rubber composite for mixing may be composed of the following ingredients by mass: natural rubber, 100 parts; N550 carbon black, 50 parts; stearic acid, 3 parts; zinc oxide, 5 parts; accelerator DM, 0.6 parts; and sulfur, 1.5 parts. After weighing the ingredients according to the formula, a mixing process thereof is carried out according to the Chinese national standard in the art and specific experimental steps may include steps S1~S3 as follows:

S1, the carbon black is placed in a drying box to dry before the mixing, and after the drying the dried carbon black is placed in a clean environment for later use.

S2, during the mixing, firstly, an operating distance between two baffles is set to be 200 mm, a roller temperature is controlled to be 70° C., and a distance between two rollers of a mixer is adjusted to be 1.4 mm. The natural rubber is added without wrapping the rollers and the added material is broken once, and then the natural rubber is wrapped on a front roller, cutting is carried out twice, and an operation time is 2 minutes. Afterwards, the distance between the rollers is adjusted to be 1.65 mm, the stearic acid is added, cutting is carried out once during the operation time, and the operation time is 2.5 minutes. A mixture of the sulfur, the accelerator DM (Vulcanization accelerator) and the zinc oxide is added in two times, cutting is carried out twice during the operation time, and the operation time is 2 minutes. Subsequently, the distance between the rollers is adjusted to be 1.9 mm, all the carbon black is added in multiple times and cutting is carried out twice during the operation time, the carbon black fallen in a receiving tray then is mixed into the rubber again, cutting is carried out three times and the operation time is 7.5 minutes, so as to make the carbon black be uniformly mixed in the natural rubber. It should be noted that when there are obvious powders on the mixed rubber, the cutting is not carried out, and all the materials fallen into the tray must be mixed into the rubber. After that, the distance between the rollers is adjusted to be 0.8 mm, the curled rubber is let to uprightly pass through a gap between the rollers six times without wrapping the rollers. The distance between the rollers is adjusted so that a thickness of a rubber composite sheet is not less than 6 mm, a folded rubber composite sheet is then let to pass through the gap between the rollers four times, and the operation time is 1 minute. A total operation time for the above-mentioned operations is 17 minutes. Finally, the distance between the rollers is adjusted to be 2.2 mm for unloading the rubber composite sheet. The rubber composite sheet prepared after the mixing is then placed on a flat, dry and clean metal plate to be cooled down, and the cooled rubber composite sheet is dried for later use.

S3, a vulcanization is implemented according to the standard. Firstly, the previously prepared rubber composite sheet is trimmed according to a size of standard mold, a temperature of a plate of a vulcanizing machine is raised, the mold is then placed on a suitable position of the plate to preheat for 20 minutes, and after the temperature stabilizes, the trimmed rubber composite sheet is quickly installed in the mold for vulcanization. After it is installed in the mold, when a pressure applied onto the mold meets a requirement, the time is started to be counted immediately and the vulcanization time is set to be 30 minutes. After the vulcanization, the vulcanized rubber composite sheet is removed from the mold to obtain a mixed rubber composite of rubber and carbon black N550 as a rubber product for later use.

(2) using a cutter to prepare the rubber product obtained in step (1) into a strip (i.e., strip rubber product) of appropriate size, clamping the strip with an AFM dedicated sample clamper and putting it into a chamber of a microtome/slicer, and tightening a screw to fix the strip in the microtome. A trimming knife and an AFM slicing knife are installed on two sides of a knife holder and then put into the chamber of the microtome, one side of the trimming knife is aligned with the sample, and a screw is tightened to fix the knife holder.

(3) operating a display screen to pump liquid nitrogen to cool the chamber of the microtome, setting temperatures of a sample holder, the knife holder and the chamber to be −60° C., and after the temperatures of the sample holder, the knife holder and the chamber all drop and then stabilize at −60° C., using an AFM dedicated slicing knife to slice/cut the rubber sample (strip) so as to cut out a flat surface, with a slicing/cutting speed of 1 mm/s and a slice thickness of 50 nm, cleaning the cut surface of the sample 2-5 times with absolute alcohol at room temperature and placing the slice under a microscope for observation until there is no debris and for later use.

(4) scanning the cut surface of the sample prepared in step (3) in the TappingMode™ by an AFM probe under room temperature and atmospheric conditions, and obtaining its morphological diagram and phase diagram.

Figure 7B:
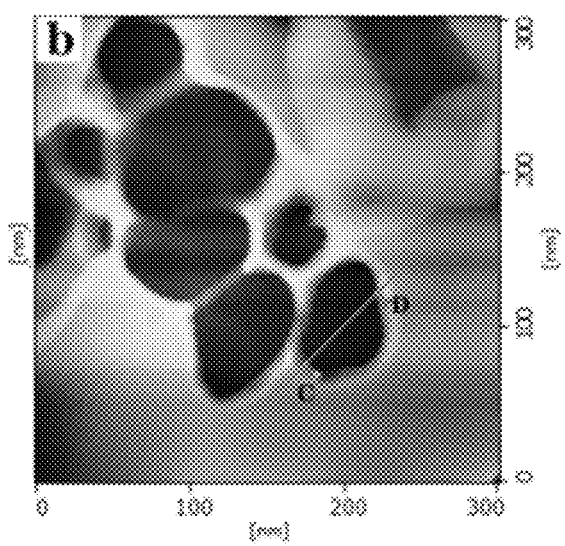
Figure 8:
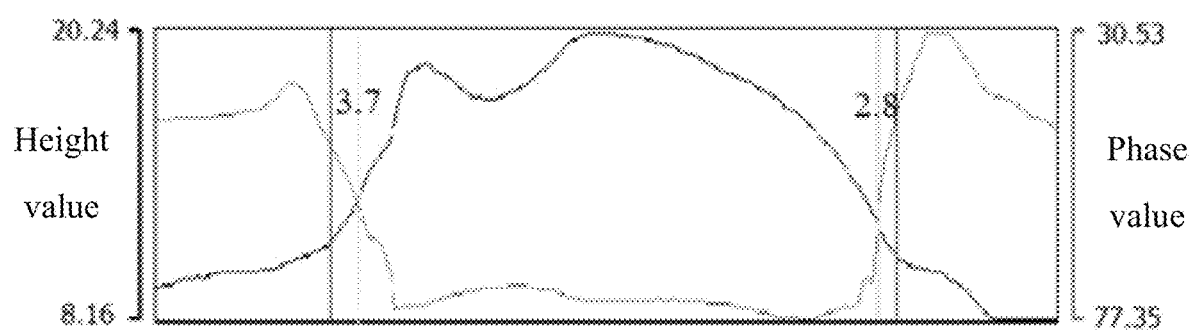
FIG. 8 is a cross-sectional profile view of a carbon black particle taken at positions of scribe lines in the AFM images according to the embodiment 3 of the disclosure.

(5) using an AFM analysis software to mark positions of a same carbon black aggregate in the morphological diagram and the phase diagram obtained in step (4) with same straight lines. As shown in FIG. 7A-FIG. 7B, firstly, points are used in the morphological diagram (FIG. 7A) to mark edge points A and B of the carbon black aggregate on the straight line, i.e., two inner side marking points associated with the straight line; and meanwhile, points are used in the phase diagram (FIG. 7B) to mark critical points C and D of the straight line being about to reach the rubber, i.e., two outer side marking points associated with the straight line, and therefore the brown structure is located between the carbon black aggregate and the natural rubber. As seen from profile curves (FIG. 8), phase values between the two edge points are basically maintained at one value, and height values of a region from the edge point to the critical point on a same side gradually decrease. In summary, a hardness of the brown structure is between that of the carbon black and that of the natural rubber, indicating that in the phase diagram the black should be the carbon black phase and the yellow is the natural rubber phase, and the transitional brown structure is the bonded rubber. By observing the distance between every two adjacent edge point and the critical point, the thickness of the bonded rubber can be obtained as 2.8~3.7 nm.

Sum up, it can be seen that the thicknesses of the bonded rubbers formed between different types of carbon black and the rubber are different. The N115 carbon black has the smallest primary grain size, so it can be seen that the increase in the primary grain size of the carbon black will lead to the decrease in thickness of the bonded rubber, this is because the carbon black with a relatively smaller primary grain size can be better dispersed in the rubber and has a stronger interaction, and so it will produce the bonded rubber with a relatively large thickness.

Finally, it should be noted that the above embodiments are only used to illustrate the technical solutions of the disclosure and not to limit the disclosure. Although the disclosure has been described in detail with reference to the preferred embodiments, those of ordinary skill in the art should understand that modifications or equivalent replacements can be made to the technical solution of the disclosure without departing from the purpose and scope of the technical solution of the disclosure, which should be covered by the scope of the claims of the disclosure.

What is claimed is:

1. A method for detecting a thickness of bonded rubber of a carbon black in a natural rubber based for reinforcement performance, comprising steps of:
   (1) using a cutter to prepare a rubber product to-be-detected into a strip rubber product of a predetermined size, clamping the strip rubber product by an atomic force microscope (AFM) dedicated sample clamper and putting the clamped strip rubber product into a chamber of a microtome, and tightening a screw to fix the strip rubber product in the microtome, wherein the rubber product to-be-detected is obtained by mixing a rubber, a carbon black and an additive to form a rubber composite and then performing a vulcanization reaction on the rubber composite, and the additive is one or more selected from the group consisting of a reinforcing filler, an antioxidant, oil and a vulcanization system;
   (2) making a temperature of the fixed strip rubber product be in a range of −100° C.~−60° C., using an AFM dedicated slicing knife to slice the strip rubber product to cut out a flat surface, cleaning the cut surface of a slice 2-5 times with absolute alcohol at room temperature and placing the slice under a microscope for observation until there is no debris and then for later use;
   (3) scanning the cut surface of the slice prepared in step (2) by an AFM probe at room temperature and atmospheric conditions to obtain a morphological diagram and a phase diagram of the cut surface; and
   (4) measuring a thickness of a bonded rubber by observing the morphological diagram and the phase diagram, and determining a reinforcement performance of the carbon black in the rubber product to-be-detected according to the thickness of the bonded rubber.

2. The method for detecting a thickness of bonded rubber of a carbon black in a natural rubber based for reinforcement performance according to claim 1, wherein the vulcanization system comprises sulfur, a vulcanization accelerator and zinc oxide.

3. The method for detecting a thickness of bonded rubber of a carbon black in a natural rubber based for reinforcement performance according to claim 1, wherein a velocity of slicing the strip rubber product is 1~3 mm/s.

4. The method for detecting a thickness of bonded rubber of a carbon black in a natural rubber based for reinforcement performance according to claim 1, wherein a thickness of the slice is 50~100 nm.

5. The method for detecting a thickness of bonded rubber of a carbon black in a natural rubber based for reinforcement performance according to claim 1, wherein a time for the vulcanization reaction is 30~50 minutes.

* * * * *